Patented Jan. 14, 1936

2,027,914

UNITED STATES PATENT OFFICE 2,027,914

PROCESS FOR THE MANUFACTURE OF BROMINATION PRODUCTS OF VAT DYE-STUFFS

Karl Krauer, Basel, Switzerland, assignor to the firm Society of Chemical Industry in Basle, Basel, Switzerland No Drawing. Application May 9, 1935, Serial No. 20,678. In Switzerland May 19, 1934

12 Claims. (Cl. 260—61)

It is known that the properties of vat-dyestuffs can be improved by brominating the dyestuff. The bromination can be conducted in various solvents, for example in organic, indifferent diluents, such as nitrobenzene, dichlorobenzene or tetrachlorethylene, or in inorganic media, such as water, sulfuric acid or chlorosulfonic acid. It is also known that the bromination may be aided or influenced by the addition of catalysts, for instance a non-metal, such as sulfur, iodine, selenium, phosphorus; or a metal, such as copper, nickel, iron, manganese, aluminium or antimony; or a metal salt, such as ferric chloride, ferric bromide or aluminium chloride.

This invention relates to a process of brominating vat-dyestuffs in the presence of an indifferent organic diluent, such as nitrobenzene, which is improved in very valuable directions by the addition of hydrogen halide salts of zinc, the halogens of which have an atomic weight greater than 30, such as zinc chloride, zinc bromide or zinc iodide. The effect of the zinc halide is remarkable from two points of view; on the one hand it allows an essential economy of bromine; on the other hand it affords a way of directing the bromination, that is to say with the same bromine content there are obtained different products accordingly as the operation has been conducted in the presence or absence of zinc halide.

A further characteristic feature of the present invention consists in the fact that it is advisable not to use too small quantities of zinc chloride or zinc halide, but quantities which amount to 10 to 60 per cent. of the weight of the dyestuff to be brominated. In this connection it is explicitly pointed out, however, that the present invention also permits the use of such quantities of zinc halide which amount to less than 10 or more than 60 per cent. of the weight of the dyestuff to be brominated.

The invention is applicable to the various vat-dyestuffs of the anthraquinone series, and the effect of the invention on dyestuffs of the isodibenzanthrone series is particularly characteristic.

For example, isodibenzanthrone may be brominated in presence of nitrobenzene with bromine at a raised temperature. When operating in this manner, according to the proportion of bromine used, 1, 2 or 3 bromine atoms may be introduced into the isodibenzanthrone molecule. The tint of the dyeings with the products thus obtained is the bluer the more bromine has been introduced into the molecule. The dibrominated product is already a fairly blue violet, which is remarkable for its other very valuable properties. If now the bromination is conducted in presence of zinc chloride the product, which contains a considerably smaller proportion of bromine, dyes very bluish violet tints. For example, when one operates in nitrobenzene solution in presence of about 40 per cent. of zinc chloride, calculated on the weight of the isodibenzanthrone, there is already obtained a product consisting of a mixture of mono- and dibromisodibenzanthrone (bromine content about 20 per cent.; bromine content of mono-bromisodibenzanthrone=14.6 per cent.; that of dibromisobenzanthrone=26.1 per cent.). These dyestuffs dye the same blue tints as are obtained with the tri-brominated products which are produced without the use of zinc chloride, but are quite considerably bluer than those produced by the dibrominated product which is obtained without the use of zinc chloride.

The operation is similar with other dyestuffs. Instead of zinc chloride zinc bromide or zinc iodide may be used.

The following examples illustrate the invention, the parts being by weight:—

Example 1

1 part of isodibenzanthrone of the formula

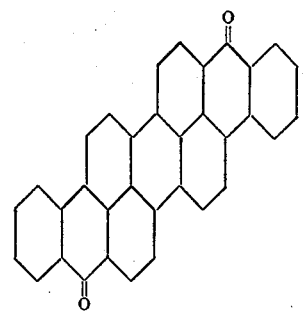

and 0.4 part of anhydrous zinc chloride are stirred into 16 parts of dry nitrobenzene while the mixture is heated to 180° C. In the course of about 20 hours there are dropped into the mixture 1.2 parts of bromine dissolved in 8 parts of nitrobenzene, the temperature being maintained at 180–185° C. When the addition of bromine is finished the reaction is allowed to proceed for 4 hours and the mass is then cooled and filtered. The filter cake is treated with steam after addition of sodium carbonate. The residue, free from nitrobenzene, is filtered, the solid matter is washed with water, dilute hydrochloric acid and again with water and then dried.

The dyestuff thus obtained which contains about 20 per cent. of bromine, dissolves in concentrated sulfuric acid to a green solution, from which the product is precipitated by addition of water, in the form of blue violet flocks. In a blue vat cotton is dyed pure blue violet tints. When less zinc chloride is used, for example 0.1 part, essentially more bromine must be introduced into the molecule in order to obtain a dyestuff dyeing the same tint (at least 26 per cent. of bromine).

By brominating dibenzanthrone in a similar manner an essentially bluer product is obtained than that produced without the use of zinc chloride. By brominating under similar conditions 1 part of dibenzpyrenequinone of the formula

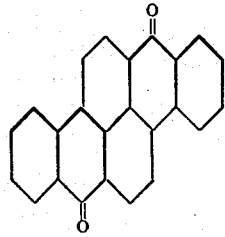

with 2 parts of bromine there is obtained a dyestuff which dissolves in sulfuric acid to blue-violet solutions and dyes cotton from the vat red-orange tints.

*Example 2*

A mixture of 25 parts of pyranthrone of the formula

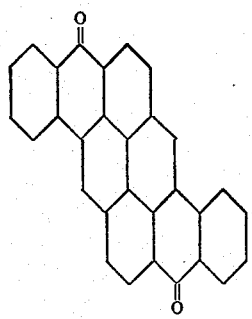

400 parts of nitrobenzene and 12.5 parts of anhydrous zinc chloride is heated at 180° C. with stirring. There is then added, by drops, at 180–185° C. a solution of 35 parts of bromine in 200 parts of nitrobenzene, in the course of 6 hours, and the reaction is allowed to proceed at the same temperature for a further 4 hours. After cooling and filtering the solid matter is treated with steam, after addition of 10 parts of sodium carbonate. The dyestuff thus freed from nitrobenzene is filtered and washed with dilute hydrochloric acid and then with hot water. The filter cake can be suspended in water and further purified by means of hot hypochlorite solution.

The dry dyestuff is a red powder, soluble in sulfuric acid to a blue solution. It dyes cotton in a violet-red vat red-orange tints.

*Example 3*

25 parts of dihydro-1,2,1',2'-anthraquinone-azine of the formula

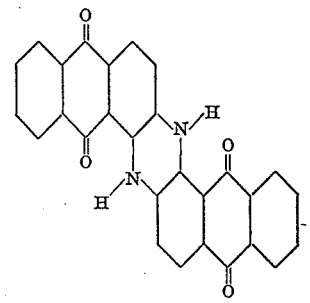

10 parts of anhydrous zinc chloride and 400 parts of nitrobenzene are heated together at 180° C. while stirring. At 180–185° C. there is added in drops in the course of about 6 hours, a solution of 30 parts of bromine in 200 parts of nitrobenzene and the reaction is allowed to proceed at the same temperature for another 4 hours. The product is worked up as described in Example 1.

The dyestuff obtained dyes cotton pure greenish-blue tints and has a better fastness to chlorine than the product obtained by the same method without the addition of zinc chloride.

What I claim is:—

1. A manufacture of brominated derivatives of vat dyestuffs of the anthraquinone series, wherein the bromination is conducted in an indifferent solvent in the presence of a zinc halide, the halogens of which have an atomic weight greater than 30.

2. A manufacture of brominated derivatives of vat dyestuffs of the anthraquinone series, wherein the bromination is conducted in an indifferent solvent in the presence of zinc chloride.

3. A manufacture of brominated derivatives of vat dyestuffs of the anthraquinone series, wherein the bromination is conducted in nitrobenzene in the presence of zinc chloride.

4. A manufacture of brominated derivatives of vat dyestuffs of the anthraquinone series, wherein the bromination is conducted in an indifferent solvent in the presence of such quantities of a zinc halide, the halogens of which have an atomic weight greater than 30, which amount to 10 to 60 per cent. of the weight of the dyestuff to be brominated.

5. A manufacture of brominated derivatives of vat dyestuffs of the anthraquinone series, wherein the bromination is conducted in an indifferent solvent in the presence of such quantities of zinc chloride which amount to 10 to 60 per cent. of the weight of the dyestuff to be brominated.

6. A manufacture of brominated derivatives of vat dyestuffs of the anthraquinone series, wherein the bromination is conducted in nitrobenzene in the presence of such quantities of zinc chloride which amount to 10 to 60 per cent. of the weight of the dyestuff to be brominated.

7. A manufacture of brominated isodibenzanthrones, wherein the bromination is conducted in an indifferent solvent in the presence of a zinc halide, the halogens of which have an atomic weight greater than 30.

8. A manufacture of brominated isodibenzanthrones, wherein the bromination is conducted in an indifferent solvent in the presence of zinc chloride.

9. A manufacture of brominated isodibenzanthrones, wherein the bromination is conducted in nitrobenzene in the presence of zinc chloride.

10. A manufacture of brominated isodibenzanthrones, wherein the bromination is conducted in an indifferent solvent in the presence of such quantities of a zinc halide, the halogens of which have an atomic weight greater than 30, which amount to 10 to 60 per cent. of the weight of the dyestuff to be brominated.

11. A manufacture of brominated isodibenzanthrones, wherein the bromination is conducted in an indifferent solvent in the presence of such quantities of zinc chloride which amount to 10 to 60 per cent. of the weight of the dyestuff to be brominated.

12. A manufacture of brominated isodibenzanthrones, wherein the bromination is conducted in nitrobenzene in the presence of such quantities of zinc chloride which amount to 10 to 60 per cent. of the weight of the dyestuff to be brominated.

KARL KRAUER.